(12) United States Patent
Klein Gunnewiek

(10) Patent No.: US 8,073,292 B2
(45) Date of Patent: Dec. 6, 2011

(54) DIRECTIONAL HOLE FILLING IN IMAGES

(75) Inventor: Reinier Bernardus Maria Klein Gunnewiek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 743 days.

(21) Appl. No.: 12/280,573

(22) PCT Filed: Feb. 5, 2007

(86) PCT No.: PCT/IB2007/050376
§ 371 (c)(1),
(2), (4) Date: Aug. 25, 2008

(87) PCT Pub. No.: WO2007/099465
PCT Pub. Date: Sep. 7, 2007

(65) Prior Publication Data
US 2009/0016640 A1    Jan. 15, 2009

(30) Foreign Application Priority Data
Feb. 28, 2006    (EP) ..................................... 06110492

(51) Int. Cl.
*G06K 9/32* (2006.01)
(52) U.S. Cl. ......................................... 382/300; 345/606
(58) Field of Classification Search .................. None
See application file for complete search history.

(56) References Cited

U.S. PATENT DOCUMENTS
5,475,769 A * 12/1995 Wober et al. .................. 382/167
6,134,352 A    10/2000 Radha et al.
2003/0034976 A1    2/2003 Raskar et al.
2004/0091170 A1 *  5/2004 Cornog et al. ................. 382/276
2005/0074186 A1    4/2005 Lu et al.

FOREIGN PATENT DOCUMENTS
EP    1437898 A1    7/2004
EP    1494175 A1    1/2005

OTHER PUBLICATIONS

Liang Zhang and Wa James Tam, Stereoscopic Image Generation Based on Depth Images for 3D TV, Jun. 2005, IEEE Transactions on Broadcasting, vol. 51, No. 2.*

(Continued)

*Primary Examiner* — Claire X Wang
*Assistant Examiner* — Siamak Harandi

(57) ABSTRACT

When transforming a 2.5D video format to a plurality of images viewed from different virtual positions, it can occur that for certain output pixels, no input data is available. Therefore, these output pixels do not have any definite values assigned in their pixel locations. These unassigned pixel values cause artifacts called 'holes' in the transformed images. A method of hole filling or assigning pixel values in a region (110) comprising pixel locations of unassigned pixel values in an image (100) is provided. A direction (140) of an image feature (160) relative to a first pixel location (120) is estimated in a first neighborhood (130) adjoining the region (110) of unassigned pixel values. A second set of pixel values is selected from pixel locations in the estimated direction (140) from the first pixel location (120). A third set of pixel values are computed from the second set of pixel values. At least a part of the region (110) comprising pixel locations of unassigned pixels is assigned with pixel values by using the third set of pixel values. The method is useful in reducing the visual distortion in the image compared to known methods.

9 Claims, 7 Drawing Sheets

OTHER PUBLICATIONS

Tsekeridou S et al: "MPEG-2 Error Concealment Based on Block-Matching Principles" IEEE Transactions on Circuits and Systems for Video Technology, IEEE Service Center, Piscataway, NJ, US, vol. 10, No. 4, Jun. 2000, pp. 646-658.

Christoph Fehn: Depth-Image-Based Rendering (DIBR), Compression and Transmission for a New Approach on 3D-TV, Proc. of SPIE Stereoscopic Displays and Virtual Reality Systems XI, SPIE vol. 5291, Jan. 2004, pp. 93-104.

Wilson Kwok, et al: Multi-Directional Interpolation for Spatial Error Concealment, IEEE Transaction on Consumer Electronics, vol. 39, No. 3, Aug. 1, 1993, pp. 455-460.

* cited by examiner

DIRECTIONAL HOLE FILLING IN IMAGES

The invention relates to image processing, more particularly to assigning pixel values to unassigned pixel locations in an image.

Providing depth perception when displaying video information comprising image sequences on a compatible 2D display is an area of growing interest. A possible method of providing depth perception is by presenting to a viewer at least two images of a same scene, viewed from two positions a little way apart from each other. Apparent displacement or difference in apparent direction of objects of the same scene viewed from two different positions is called parallax. Parallax allows the viewer to perceive the depth of objects in a scene. A plurality of images of the same scene, viewed from different virtual positions, can be obtained by transforming a 2D image supplied with depth data for each pixel value of the 2D image. For each point in the scene, a distance of the point to the image capturing device, or to another reference point, or to a plane such as a projection screen, is captured in addition to a pixel value. Such a format is usually referred to as a 2.5 D (image+depth) video format.

When transforming a 2.5D video format to a plurality of images viewed from different positions, it can occur that for certain output pixels, no input data is available. Therefore, these output pixels do not have any definite values assigned in their pixel locations. These unassigned pixel values cause artifacts called 'holes' in the transformed images. In this document, a 'hole' or a 'region with unassigned pixels' will be interchangeably used to refer to a region comprising pixel locations of unassigned pixel values. The adverse visual effect of a hole is more pronounced in an occlusion region. An occlusion and a de-occlusion region in video information are caused by the movement of a foreground object against a background region. Discontinuities in depth data typically occur at the transition from foreground to background, causing de-occlusion of the background resulting in holes in the transformed plurality of images. Hole filling algorithms can be employed to overcome these artifacts.

Holes can also occur in decoded output of 2D video information comprising image sequences that were encoded according to well known video compression schemes that use forward motion compensation. In such a video compression scheme, regions of pixels in a frame are predicted from projected regions of pixels of a previous frame. This is called a shift motion prediction scheme. In this scheme of prediction, some regions overlap and some regions are disjoint due to motion of objects in the frames. Pixel locations in the disjoint areas do not get assigned with definite pixel values. Thus holes occur in the decoded output of 2D video information comprising image sequences. Furthermore, in object based video encoding schemes e.g. MPEG-4, where backgrounds and foregrounds are coded separately, un-referenced areas may be present in the background causing holes. Hole filling algorithms can be employed to overcome these artifacts.

Several algorithms for hole filling are discussed in the article "Depth-Image-Based Rendering (DIBR), Compression and Transmission for a New Approach on 3D-TV" by C. Fehn in Proceedings of SPIE Stereoscopic Displays and Virtual Reality Systems XI, pages 93-104, San Jose, Calif., USA, January 2004. The algorithms discussed include linear colour interpolation between scene foreground and background, simple extrapolation of the scene background and mirroring of background colour information along the borders of occlusion regions. Smoothing the depth information with a suitable Gaussian filter is also suggested. All these techniques obviously lead to varying amounts of visual distortions in the displayed image.

It is desirable to provide a method of hole filling in an image that leads to less visual distortion in the displayed image.

Accordingly, in a method of hole filling or assigning pixel values in a region comprising pixel locations of unassigned pixel values in an image, a first pixel location is selected in a first neighbourhood adjoining the region of unassigned pixel values. A second neighbourhood that includes the first pixel location is also selected. A direction of an image feature relative to the first pixel location is estimated using a first set of pixel values from the second neighbourhood. A second set of pixel values is selected from pixel locations in the estimated direction from the first pixel location. A third set of pixel values are computed from the second set of pixel values. At least a part of the region comprising pixel locations of unassigned pixels is assigned with pixel values by using the third set of pixel values.

It is also desirable to provide an image processing device for hole filling in an image that leads to less visual distortion in the displayed image.

Accordingly, a device is provided for hole filling or assigning pixel values to pixel locations in a region comprising pixel locations of unassigned pixel values in an image. The device comprises a first selector, a second selector, an estimator, a third selector, a first processor and a second processor. The first selector selects a first pixel location in a first neighbourhood adjoining the region of unassigned pixel values. The second selector selects a second neighbourhood that includes the first pixel location. The estimator estimates the direction of an image feature relative to the first pixel location using a first set of pixel values of the second neighbourhood. The third selector selects a second set of pixel values from pixel locations in the estimated direction from the first pixel location. The first processor computes a third set of pixel values from the second set of pixel values. The second processor assigns pixel values to pixel locations of at least a part of the region comprising pixel locations of unassigned pixel values using the third set of pixel values.

It is also desirable to provide an image processing device for hole filling, including a receiver for receiving a signal representing a sequence of images and a display device for displaying the sequence of images.

Accordingly an image processing device is provided which includes a receiver for receiving a signal representing a sequence of image and a device for hole filling or assigning pixel values to pixel locations in a region comprising pixel locations of unassigned pixel values in at least one image belonging to the sequence of images. The image processing device includes a display device for displaying the sequence of images.

It is also desirable to provide a computer program comprising code means for hole filling in an image that leads to less visual distortion in the displaced image.

Accordingly, a computer program comprising program code means is provided for hole filling or assigning pixel values to pixel locations in a region comprising pixel locations of unassigned pixel values in an image according to all the disclosed methods.

These and other aspects of the method and device for assigning pixel values to pixel locations in a region comprising pixel locations of unassigned pixel values in an image are apparent from and will be elucidated with reference to the implementation and embodiments described hereinafter and with reference to the accompanying drawings. These figures are schematic representations of one of many examples of the disclosed method and devices, wherein:

FIG. 6 illustrates a method of filling a hole after finding the directions of image features relative to pixels on the first neighbourhood of the hole;

Figure 1:
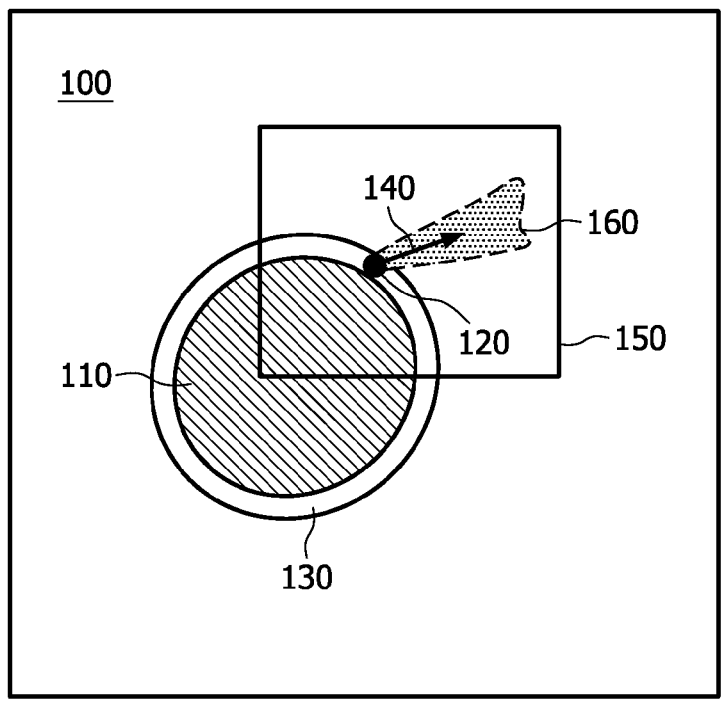
FIG. 1 is an example image with a region comprising pixel locations of unassigned pixel values and associated neighbourhoods.

FIG. 1 is an example image 100 with a region 110 comprising pixel locations of unassigned pixel values and associated neighbourhoods. The example image further shows a first pixel 120 selected from a first neighbourhood 130 of the region 110, an estimated direction 140 of an image feature 160 relative to the first pixel location 120, a second neighbourhood 150 whose pixel values are used in the estimation of direction 140. While transforming a 2.5D image data, discontinuities in depth data in occlusion regions can be one of the causes for the region 110 to occur. The region 110 can occur while computing a set of multi-view images from a lesser number of multi-view images e.g. computing a set of ten multi-view images from a stereo pair. The region 110 can also occur as a result of shift motion prediction scheme or an object based coding scheme in a well known video compression scheme e.g. MPEG-4. The region 110 can be called a hole. The hole 110 generally contains random or zero pixel values causing visual artifacts in the rendered image.

The first neighbourhood 130 is selected such that the first pixel location 120 selected from it is substantially close and sufficiently away from the boundary of the hole 110 to avoid pixels in the transition region. In this example, the first neighbourhood 130 is shown as a narrow strip of a few pixels width around the perimeter of the hole 110. In case of a foreground object moving against a background region, the first neighbourhood 130 is selected only from the background region. It is assumed that the foreground and background regions in a scene are already identified. The image feature 160 is a representative feature e.g. a linear feature or a texture feature present in the image 100. The direction 140 of the image feature 160 relative to the first pixel location 120, is estimated using a first set of pixel values in the second neighbourhood 150. The first set of pixel values in the second neighbourhood 150 are selected by excluding the unassigned pixel values of the hole 110. Note that the second neighbourhood 150 can overlap with the first neighbourhood 130 and also with the hole 110.

Figure 2:
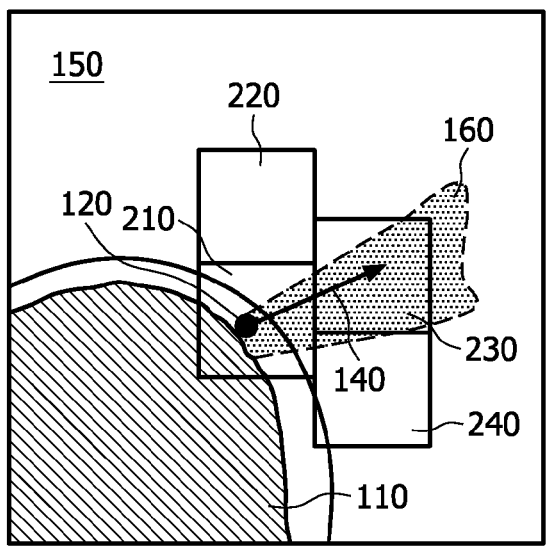
FIG. 2 is an enlarged view of a part of the example image.

FIG. 2 is an enlarged view of a part 150 of the example image 100. A first region 210 and a few candidate regions 220, 230, 240 are also shown. These candidate regions are used in the estimation of a direction 140 of an image feature 160 relative to the first pixel 120. The first region 210 is shown to include the first pixel location 120 and overlapping with the hole 110. A number of candidate regions 220, 230, 240 are adjacent to the first region 210 and are located in the second neighbourhood 150. The first region 210 and the candidate regions 220, 230, 240 may be adjoining, overlapping or disjoint to each other. The shape of these regions need not be restricted to the square shape shown. Several shapes, e.g. rectangular or irregular shapes corresponding to an object in the image are possible. In the example shown, the image feature 140 is present in the first region 210 and in one of the candidate regions 230. The location of the candidate region 230 is determined from the pixel values in the neighbourhood 150.

Figure 3:
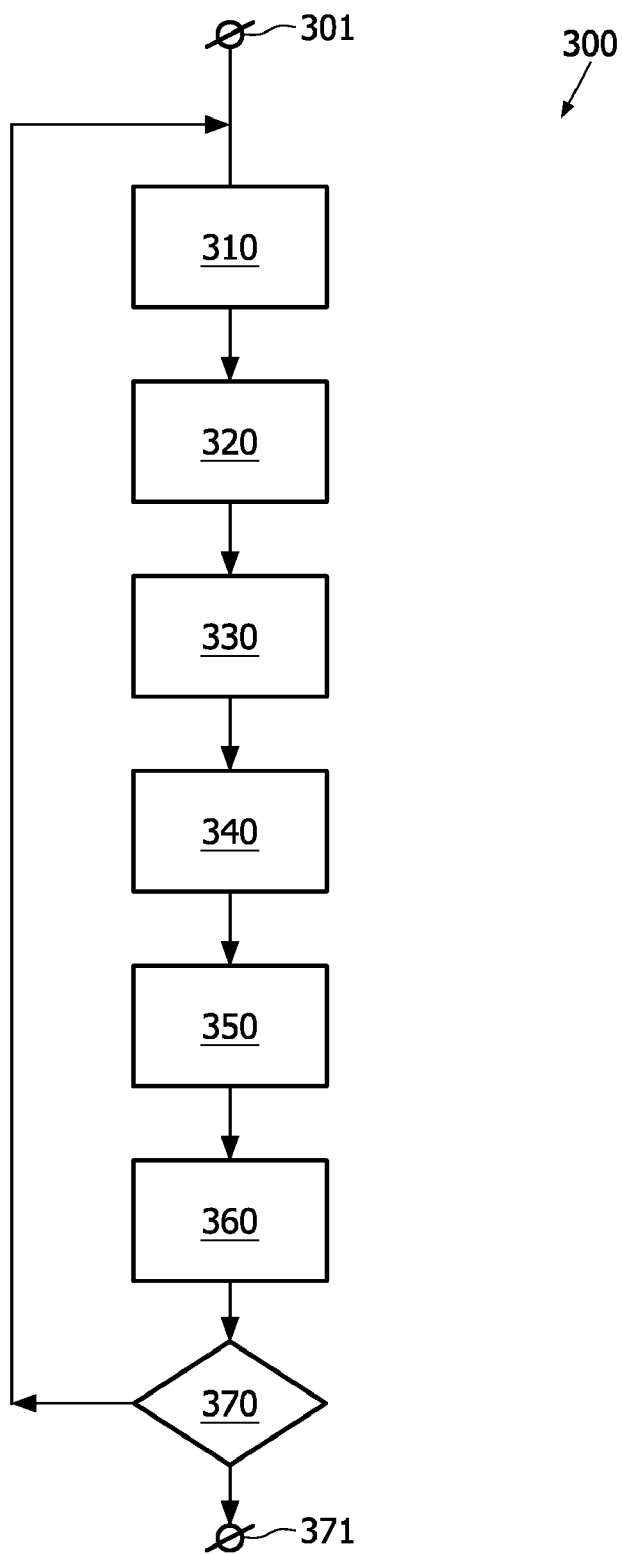
FIG. 3 is a flow chart illustrating a method of hole filling in images.

FIG. 3 is a flow chart illustrating a method 300 of hole filling in images. The image 100 comprising one or more regions of unassigned pixel values is made available at the starting step 301. A first pixel location 120 is selected in a first neighbourhood 130 in the first step 310. In the next step 320, a second neighbourhood 150 is selected to include the first pixel location 120. The second neighbourhood 150 is chosen such that it is possible to identify and estimate the direction 140 of an image feature 160 e.g. a texture or a linear feature in it. The direction 140 of the image feature 160 is estimated in the next step 330 from the pixel values of the second neighbourhood 150. The details of direction estimation will be explained in the description of FIG. 4. In the next step 340, a second set of pixel values are selected in the estimated direction 140. The sequential order of the selected pixels is preserved for subsequent use. In step 350, a third set of pixel values is computed from the second set of pixel values. In one of the embodiments, the third set of pixel values can be obtained by interpolating the values of the second set of pixel values. In another embodiment, the third set of pixel values can be extrapolated from the values of the second set of pixel values. The number of pixels in the second and the third set need not be the same. One of the many well known interpolation techniques e.g. polynomial curve fitting, of deriving a set of pixel values from another set of pixel values can be applied. A part of the region 110 is assigned with pixel values derived from the third set of pixel values in the next step 360. In one of the embodiments, pixel values in the direction 140 of the image feature 160 are extended to fill the region 110. The pixel locations lying in the extended direction of the image feature with reference to the first pixel location are filled using the third set of pixel values. When a foreground object is moving against a background region, the foreground object uncovers certain area of the background region. The hole created in such a case is typically filled with the pixels derived from the background region. Continuity of the image feature is preserved in the extended direction and the visual distortion is minimised. In one of the embodiments, pixel values from the estimated direction are used in the reverse order (mirroring) for filling the unassigned pixel locations in the region 110. The results obtained from the proposed embodiments are better than blurring or extrapolation or interpolation of pixel values selected in fixed directions such as horizontal or vertical direction. The steps 310-360 are repeated for a number of selected first pixels in the first neighbourhood and the hole is filled gradually. A controlling step 370 is provided to ensure that the method 300 is repeated until the region 110 is completely filled. The controlling step 370 also ensures that all the regions with unassigned pixel values are filled with appropriate pixel values by one of the said embodiments. A few isolated pixel location may still be unassigned due to the errors that arise due to the representation of direction in a digital grid. Pixel values from the nearest neighbours can be used to fill in such isolated pixels. After being filled with appropriate pixel values in the regions of unassigned pixel values, the image 100 is made available at the output 371 of the method 300.

For filling holes in occlusion regions caused by the movement of a foreground object against a background region, the foreground object has to be identified first. While rendering frames for 3D displays, the foreground/background information can be obtained from the depth map and the rendering algorithm. In case of a motion compensated video compression system, the same information can be obtained from the motion vector field and the occlusion regions.

Figure 4:
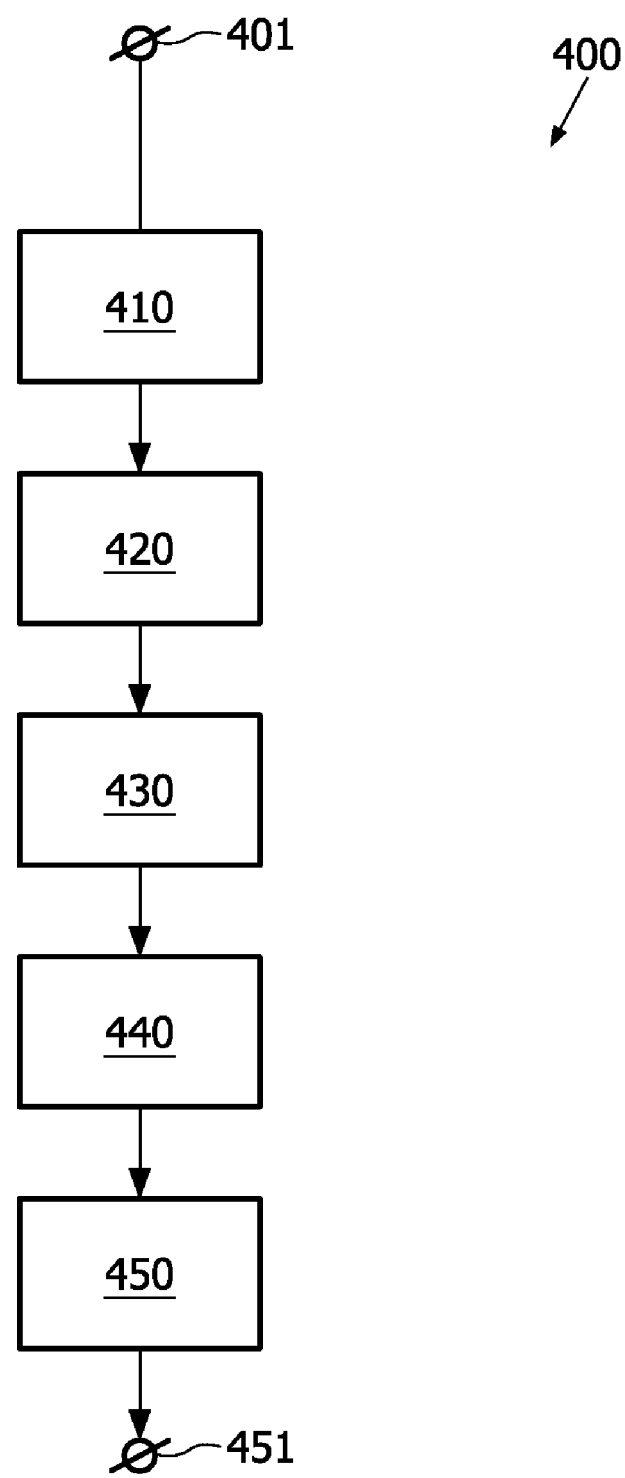
FIG. 4 is a flow chart illustrating a step of estimating the direction of an image feature.

FIG. 4 is a flow chart illustrating the step 400 of estimating the direction 140 of the image feature 160. The region 100 comprising the hole 110, the first pixel location 120, the first neighbourhood 130 and the second neighbourhood 150 is made available at the input 401 of the step 400. In the first step 410, the first region 210 around the first pixel location 120 is chosen. The first region 210 contains a part of the image feature 160. A number of candidate regions 220, 230, 240 are selected in the next step 420. The candidate regions can be selected at a predetermined, fixed distance from the first region 210. The candidate regions 220, 230, 240 may or may not overlap the region 100. A large number of candidate regions may be selected to find the extension of the image feature 160. Pixel values of the first region 210 are used in the calculation of a similarity value with pixel values of each one of the candidate regions. The unassigned pixel values that belong to the region 210 are excluded in the computation of similarity values.

A similarity value is calculated in the next step 430 for each one of the candidate regions by comparing the available pixels of the first region 210 with respective pixels of each one of the candidate regions 220, 230, 240. The similarity value can be e.g. based on a correlation measure of pixels or a normalised sum of mean absolute deviation of the respective pixels. A correlation measure based on several values derived from pixel values e.g. mean intensity or variance can also be used in the computation of the similarity value. From the set of computed similarity values, a particular candidate region 230 that is best matching with the first region 210 is identified in the next step 440. The best matching candidate region 230 typically contains the extension of the image feature 160 and the location of the particular candidate region 230 indicates the possible direction of the image feature 160. In the next step 450, the direction of the image feature 160 is estimated from the location of the first region 210 and the location of the best matching candidate region 230.

Figure 5:
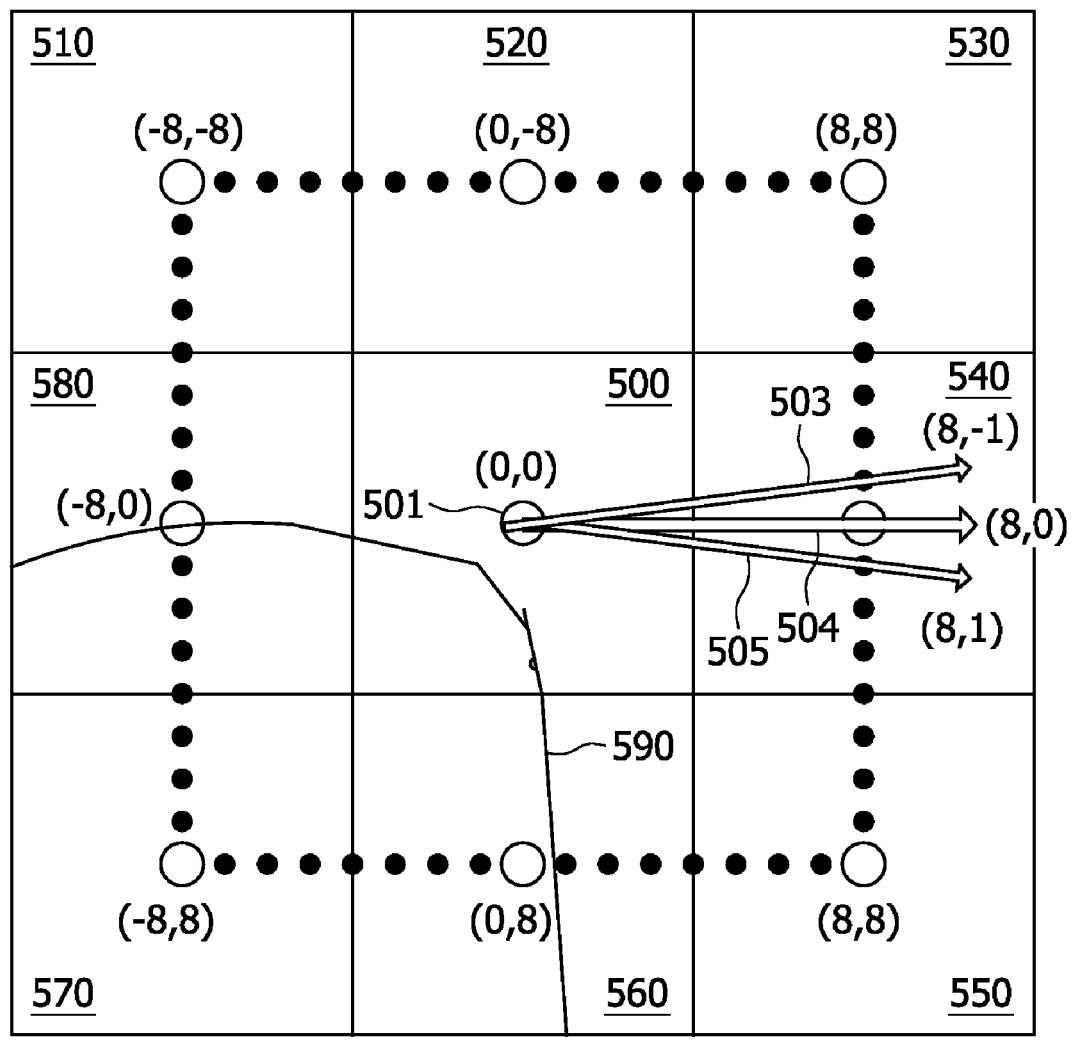
FIG. 5 illustrates relative positions of a first region and a number of candidate regions.

FIG. 5 illustrates relative positions of a first region 500 and a number of candidate regions. In this example, a first pixel 501 is assumed to be located at the origin (0,0). The first region 500 is shown in solid lines as a square block of 8×8 pixels located at the origin. A set of eight possible candidate regions 510-580 are shown in discontinuous lines as square blocks of 8×8 pixels in the neighbourhood of the first region 500. In this example, the locations of candidate regions are shown as blank circles. These locations are chosen such that their absolute distance from the first pixel location is eight pixel units in either or both the horizontal and vertical directions. More candidate regions can be selected at intermediate positions shown as filled circles. There are a total of 64 possible locations (blank and filled circles) shown in the neighbourhood of the first region. A boundary 590 of a hole is shown. The candidate regions whose locations e.g. (−8, 8), (8,8) that fall within the hole need not necessarily participate in the computation of similarity values. The similarity values are calculated for the candidate regions that are located typically at all filled circles and blank circles outside the boundary 590 of the hole. From the set of similarity values, a candidate region closely matching with the first region 510 is selected. From the location of the selected candidate region, the direction relative to the first pixel is estimated. If the selected candidate region is located at e.g. (8,0), the direction 504 of the line joining (0,0) and (8,0) can be represented as (8,0) in this example. Two more examples of directions 503, 505 of the line joining (0,0) with (8,−1) and (8,+1) are also illustrated in FIG. 5.

Figures 6A, 6B:
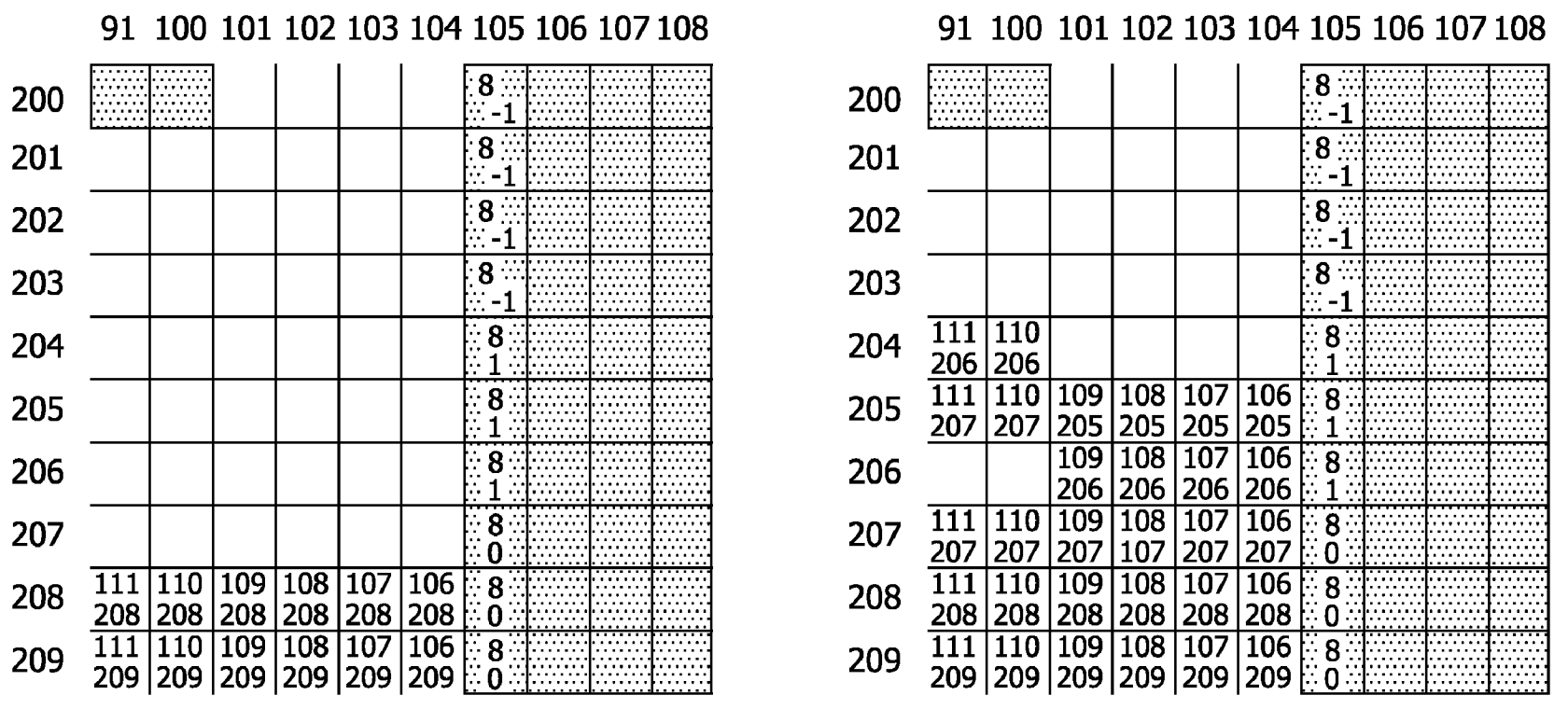
Figures 6C, 6D:
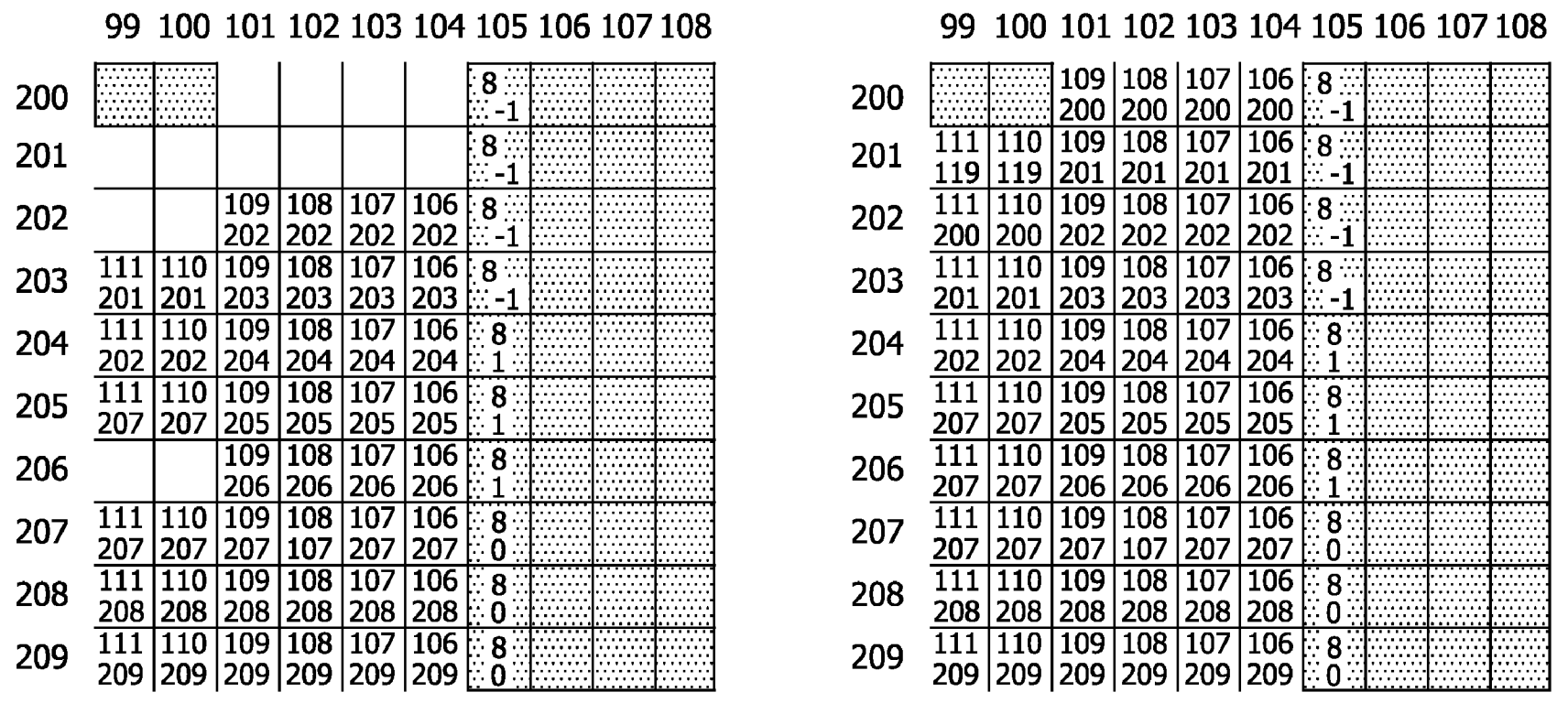

FIG. 6 illustrates a method of filling a hole after finding the directions of image features relative to pixels on the first neighbourhood of the hole. The filling is demonstrated in four stages in the FIGS. 6 (a), (b), (c) and (d). Blank squares represent the pixel locations of unassigned values and shaded squares represent the pixel locations of known values. The region of shaded squares is assumed to comprise one or more image features. The blank and shaded regions form a part of a digital image with row numbers from 200 to 209 and column numbers from 99 to 105. The coordinates of the top left corner are (91, 200). In column 105, the directions of the image features at the respective pixel locations in that column are shown. The directions (8,1), (8,0) and (8,−1) follow the notations explained in the description of FIG. 5. Pixel locations in the hole are first filled with the row and column numbers of the known pixel values from the shaded squares of the image. In the first step, coordinates are filled and in the subsequent step, actual pixel values are filled. In one embodiment, known pixel values in the direction mentioned at each pixel location e.g. (8,0) in column 105 are first selected. The selected pixels are used to fill up the blank squares in the reverse order (mirroring) in the reverse direction. On a digital grid, discontinuities may occur while representing directions other than horizontal and vertical directions. Due to the discontinuities, the pixel values are filled up in a piece-wise linear fashion. In FIG. 6 (a) and (b), the direction (8,0) being horizontal, three rows 207, 208, 209 at the lower parts of the hole are filled without any discontinuity. The next two lines in the extension of (8,1) are filled in a piece-wise linear fashion. As shown in FIG. 6 (b), in row 206, the four pixels closer to the column 105 are filled first. The remaining two pixels are shifted up by one row and therefore blank spaces are observed in the locations (99,207) and (100, 206). In rows 202 and 203, pixels from direction (8,−1) are used for filling blank locations. Four pixel locations in columns 99 and 100 in the rows 202, 203 are already filled with the pixels from the direction (8,1). These four locations can either be filled with the pixels from the direction (8,1) or from the direction (8, −1). In such situations of multiple choices, the pixels from a stronger direction of an image feature, having a higher similarity value can be chosen. The number of pixels selected in the estimated direction need not be equal to the number of pixels required to be filled in the hole. Required number of unknown pixels can be derived from a lesser or more number of known pixels, by any one of the well known interpolation or extrapolation methods.

Figure 7:
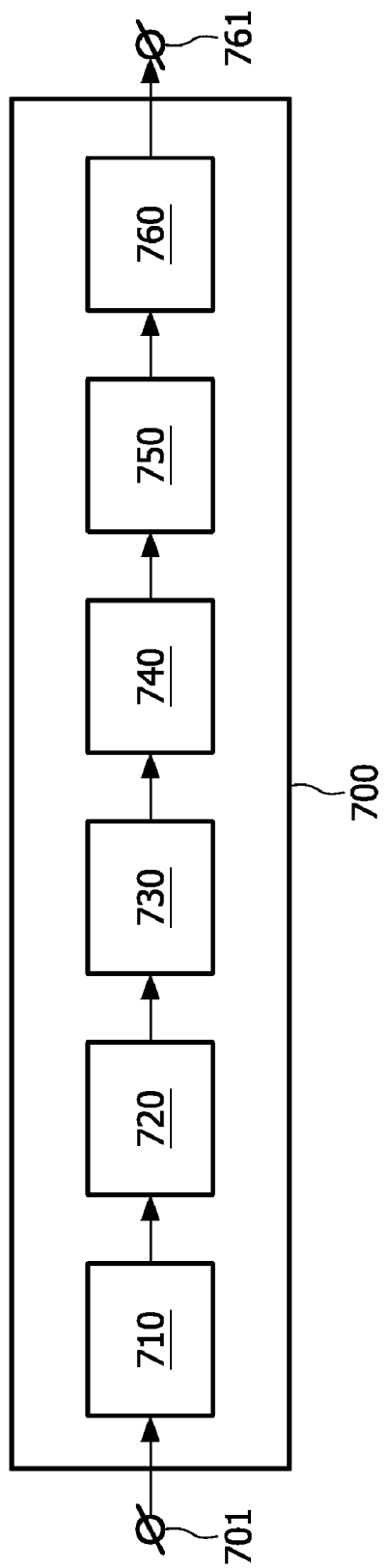
FIG. 7 is an embodiment of a device for hole filling in images.

FIG. 7 is an embodiment of an image processing device 700 for hole filling in images The device 700 comprises a first selector 710, a second selector 720, an estimator 730, a third selector 740, a first processor 750 and a second processor 760. The first selector 710 is arranged to select the first pixel 120 and the first neighbourhood 130. The second selector 720 is arranged to select a second neighbourhood 150. The estimator 730 is arranged to estimate a direction 140 of an image feature 160 relative to the first pixel location 120. The third selector 740 is arranged to select a second set of pixel values from respective pixel locations in the estimated direction 140. The first processor 750 is arranged to compute a third set of pixel values from the second set of pixel values. The second processor 760 is arranged to assign pixel values from the third set of pixel values to the unassigned pixel values.

Figure 8:
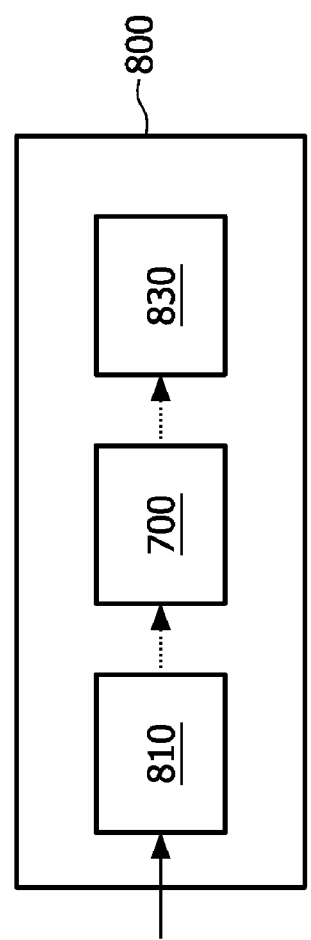
FIG. 8 is an embodiment of an image processing device including a device for hole filling, a receiver and a display device.

FIG. 8 is an embodiment of an image processing device 800 including a device for hole filling, a receiver 810 and a display device 830. The receiver 810 is arranged to receive a signal representing a sequence of images. The device 700 is arranged to assign pixel values to pixel locations in a region comprising pixel locations of unassigned pixel values in at least one image belonging to the sequences of images. The sequence of images may be received through a cable or terrestrial or satellite transmission system or a digital network such as the Internet. The image processing device 800 may include additional components e.g. the display device 830 for displaying the output images. Alternately, the device 800 may supply images to a display outside the device 800. The device 800 can support one or more of the following types of consumer and professional device by incorporating additional means: a TV, a set top box, a VCR/VCP, a satellite tuner, a DVD player/recorder. Optionally the device 800 comprises storage means like a hard-disk or means for storage on removable media such as optical disks. The image processing device 800 might also be a system being utilized by a film studio or a broadcaster or a re-transmitter.

The computer program may be embedded in a device such as an integrated circuit or a computing machine as embedded software or kept pre-loaded or loaded from one of the standard storage or memory devices. The computer program can be handled in a standard comprised or detachable storage, e.g. flash memory or hard disk or CD. The computer program may be presented in any one of the known codes such as machine level codes or assembly languages or higher level languages and made to operate on any of the available platforms such as hand-held devices or personal computers or servers.

It should be noted that the above-mentioned embodiments illustrate rather than limit the invention and those skilled in the art will be able to design alternate embodiments without departing from the scope of the appended claims. In the claims, any reference signs placed between parentheses shall not be construed as limiting the claim. The word 'comprising' does not exclude the presence of elements or steps not listed in a claim. The word 'a' or 'an' preceding an element does not exclude the presence of a plurality of such elements. The invention can be implemented by means of a suitably programmed computer. In the unit claims enumerating several means, several of these means can be embodied by one and the same item of hardware.

The invention claimed is:

1. A method (300) of assigning pixel values to pixel locations in a region (110) comprising pixel locations of unassigned pixel values in an image (100), the method comprising:
   selecting (310) a first pixel location (120) in a first neighbourhood (130) adjoining the region of unassigned pixel values (110);
   selecting (320) a second neighbourhood (150) that includes the first pixel location (120);
   using a first set of pixel values of the second neighbourhood (150) to estimate (330) a direction (140) of an image feature (160) relative to the first pixel location (120);
   selecting (340) a second set of pixel values from respective pixel locations in the estimated direction (140) from the first pixel location (120);
   computing (350) a third set of pixel values from the second set of pixel values; and
   assigning (360) pixel values to pixel locations of at least a part of the region(110) comprising pixel locations of unassigned pixel values using the third set of pixel values.

2. The method (400) of claim 1, wherein estimating the direction (140) comprises:
   selecting (410) a first region (210) that includes the first pixel location (120);
   selecting (420) a number of candidate regions in the second neighbourhood (220, 230, 240);
   computing (430) a similarity value for each one of the candidate regions (220, 230, 240) and the first region (210) by comparing pixel values of each one of the candidate regions with respective pixel values of the first region (210);
   selecting (440) a particular candidate region (230) on basis of the corresponding similarity value; and
   estimating (450) the direction (140) of the image feature (160) relative to the first pixel location (120) from the location of the particular candidate region.

3. The method of claim 1, wherein computing the third set of pixel values is performed by interpolating the pixel values of the second set of pixel values.

4. The method of claim 1, wherein computing the third set of pixel values is performed by modifying the sequential order of the second set of pixel values.

5. The method of claim 2, wherein computing the similarity value is performed by computing a region correlation value of respective pixel values of each one of the selected candidate regions (220, 230, 240) with the first region (210).

6. An image processing device (700) comprising:
   a first selector (710) for selecting a first pixel location (120) in a first neighbourhood (130) of the region of unassigned pixel values (110);
   a second selector (720) for selecting a second neighbourhood (150) that includes the first pixel location (120);
   an estimator (730) for estimating a direction (140) of an image feature (160) relative to the first pixel location (120), using a first set of pixel values of the second neighbourhood (150);
   a third selector (740) for selecting a second set of pixel values from respective pixel locations in the estimated direction (140) from the first pixel location (120);
   a first processor (750) for computing a third set of pixel values from the second set of pixel values; and
   a second processor (760) for assigning pixel values to pixel locations of at least a part of the region comprising pixel locations of unassigned pixel values using the third set of pixel values.

7. The image processing device (800) of claim 6 including a receiver (810) for receiving a signal representing a sequence of images.

8. The image processing device (800) of claim 7, including a display device (830) for displaying the sequence of images.

9. A computer program comprising program code means for performing the method of claim 1 when said program is run on a computer.

* * * * *